United States Patent [19]

Vanotti

[11] 4,209,160
[45] Jun. 24, 1980

[54] ARTICULATED MOLD FOR OBJECTS HAVING UNDERCUT PARTS

[75] Inventor: Gérard Vanotti, Geovresset, France

[73] Assignee: Compagnie Generale des Etablissements Michelin, Clermont-Ferrand, France

[21] Appl. No.: 962,282

[22] Filed: Nov. 20, 1978

[30] Foreign Application Priority Data

Nov. 29, 1977 [FR] France .................... 77 36220

[51] Int. Cl.² .............................................. B29C 1/14
[52] U.S. Cl. ...................................... 249/162; 249/63;
249/161; 264/318; 425/441; 425/442; 425/443;
425/DIG. 5
[58] Field of Search ................. 425/441, 443, DIG. 5,
425/442; 264/318; 249/161, 162, 63

[56] References Cited

U.S. PATENT DOCUMENTS

| | | | |
|---|---|---|---|
| 2,859,478 | 11/1958 | Glasson | 425/DIG. 5 |
| 3,289,252 | 12/1966 | Bromley | 264/318 |
| 3,373,460 | 3/1968 | Ladney | 249/63 |

FOREIGN PATENT DOCUMENTS

513861 6/1976 U.S.S.R. ................................ 425/443

*Primary Examiner*—James. H. Derrington
*Attorney, Agent, or Firm*—Brumbaugh, Graves, Donohue & Raymond

[57] ABSTRACT

Articulated mold for the manufacture of molded objects having opposed undercut parts comprises two dies whose parting surface passes between the opposed undercut parts of the molded object. In each die there are provided shells composed of segments which can be displaced by pushers in order to open the mold and eject the molded object.

7 Claims, 3 Drawing Figures

ARTICULATED MOLD FOR OBJECTS HAVING UNDERCUT PARTS

This invention relates to an articulated mold for the manufacture of molded objects having undercut parts, i.e., having reentrant shapes. More particularly, but not exclusively, the molded objects are bodies of revolution and in particular tire valve bodies.

It is known that in order to release an object which has been obtained by molding, the mold is opened along a parting surface which is as simple as possible, generally a plane, known as the "joint plane", which is suitably selected at the time of the design of the mold. However, molded objects which have certain reentrant shapes, known as undercuts, cannot be freed in this manner; it is then necessary to design the mold in the form of several movable parts. However, one is rapidly limited when the undercuts appearing on an object oppose or face each other—the movable parts necessary for the removal of the molded object from the mold can no longer operate, since their movements would interfere with each other.

One example of such objects is supplied by tire valve bodies such as those described in U.S. application Ser. No. 891,467, filed Mar. 29, 1978. These bodies of revolution have, one behind the other, a collar, a cylindrical portion, fastening lugs distributed along a conical surface, and a second cylindrical portion. The collar and the fastening lugs have undercut surfaces which oppose or face each other.

An articulated mold for the manufacture of molded objects having opposed undercut parts in accordance with the invention comprises the combination, on the one hand, of two dies whose parting surface passes between the opposed undercut parts of the molded object, these two dies being movable normally with respect to each other and, on the other hand, of several groups of shells composed of segments arranged within said dies and capable of moving about guide members under the action of pushers, and finally a drive piece outside said dies and movable in the same direction as the dies driving said pushers along, the pushers, together with the guide members, being so arranged that upon the opening of the mold the movements of said shells succeed each other, first of all freeing the space located between the opposed undercut parts and then freeing each of said undercut parts, before ejecting the molded object, the reverse movements taking place upon the closing of the mold.

In one preferred embodiment of the invention, the parting surface of the two dies is flat.

In one of the possible variants, the outer drive piece is a plate parallel to the joint plane or parting surface of the two dies.

The guide members may work in translation or in rotation or in any other manner.

Two embodiments of the articulated mold forming the object of the invention will be described below, by way of illustration and not of limitation, with reference to the accompanying drawing in which:

FIG. 1 shows a mold which comprises two dies 1 and 2 in close contact along the parting surface or joint plane P, provided with movable shells and with mechanical parts which will be described in detail below.

Figure 1:
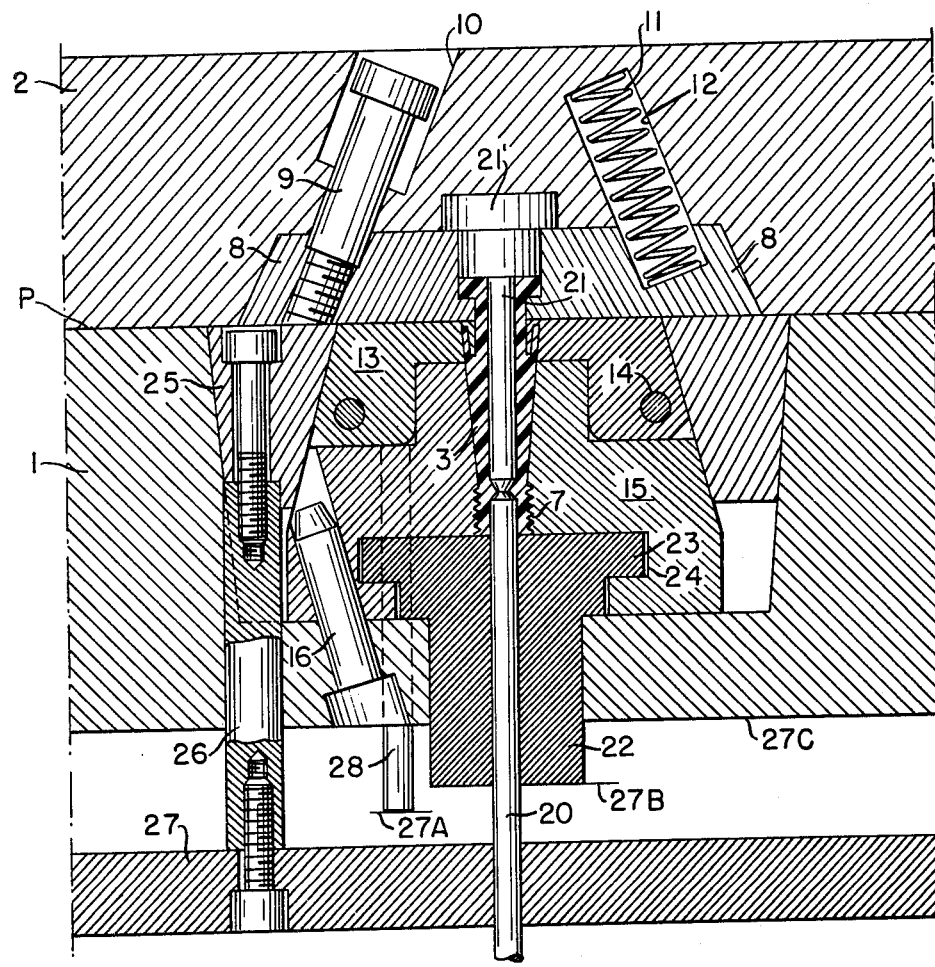
FIG. 1 is an axial section through a mold in closed position having sliding parts and pivoting parts.

The molded object 3 (FIGS. 1 and 1A) comprises a collar 4, a cylindrical portion 5, fastening lugs 6 distributed along a conical surface and a second cylindrical portion 7; the opposed undercut parts are formed by the bottom of the collar 4, on the one hand, and the space between the fastening lugs 6 and the cylindrical portion 5, on the other hand.

In the die 2 there are two half shells 8 which are flush with the parting surface or joint plane P. In these half shells 8 there are screwed guide studs 9 capable of sliding in oblique bores 10 machined in the die 2. Springs 11 arranged in oblique bores 12 act on the half shells 8, as will be seen further below.

In the die 1 there are contained, on the one hand, a shell 13 composed of six segments capable of swinging around pins 14 parallel to the parting surface or joint plane P and rigidly secured to the die 1 and, on the other hand, a shell 15 composed of six segments capable of sliding on oblique guide fingers 16, fastened in the die 1. Finally, a spindle consisting of two parts 20, 21 permits the molding of the interior shapes of the object 3; the lower part 20 of this spindle is cylindrical while the upper part 21 has a head 21' which permits the molding of the collar 4 of the object 3 and, subsequently, the extraction of this spindle out of the object 3.

The mechanical assembly of the mold is completed by:

a central block 22, the upper part 23 of which in the form of a circular crown fits in corresponding recesses 24 machined in the segments of the shell 15;

a frustoconical crown 25 screwed on one or more rods 26 firmly connected with a lower drive plate 27;

pushers 28, the length and role of which will be specified below.

Figure 1A:
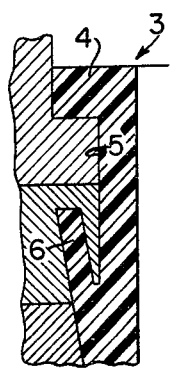
FIG. 1A is a view on a larger scale of the portion of the molded object in which the opposed undercut parts are located.

The operation of the mold opening mechanism will now be described, starting from the closed position shown in FIG. 1.

First of all, the die 2 is raised; under the push of the springs 11, the half shells 8 remain applied against the parting surface or joint plane P while the guide studs 9 slide in the oblique boreholes 10 causing the half shells 8 to move apart radially which releases the collar 4 and the upper part of the cylindrical portion 5 of the object 3; when the guide studs 9 arrive at the end of their stroke, they then lift the half shells 8 and the upper part of the half shells 8 lifts the head 21', which brings about the extraction of the upper part 21 of the spindle from the molded object 3.

Thereupon, under the effect of a vertical displacement of drive plate 27 towards the top, so as to occupy successively the positions 27A, 27B and 27C (in contact with the face of the die 1 opposite the parting surface or joint plane P), the following movements take place:

from 27 to 27A the rods 26 push against the crown 25 which unblocks the segments of the shells 13 and 15;

from 27A to 27B the pushers 28, whose length is designed for this purpose, cause the segments of shell 13 to swing around their pins 14;

from 27B to 27C the central block 22 lifts the segments of shell 15, which move away radially, since they are guided on the oblique fingers 16; and simultaneously, the central block 22 ejects the molded object 3 upwards.

Upon the closing of the mold, the reverse movements take place and, in particular, the springs 11 are compressed in order to be able to play their role upon the following opening.

Figure 2:
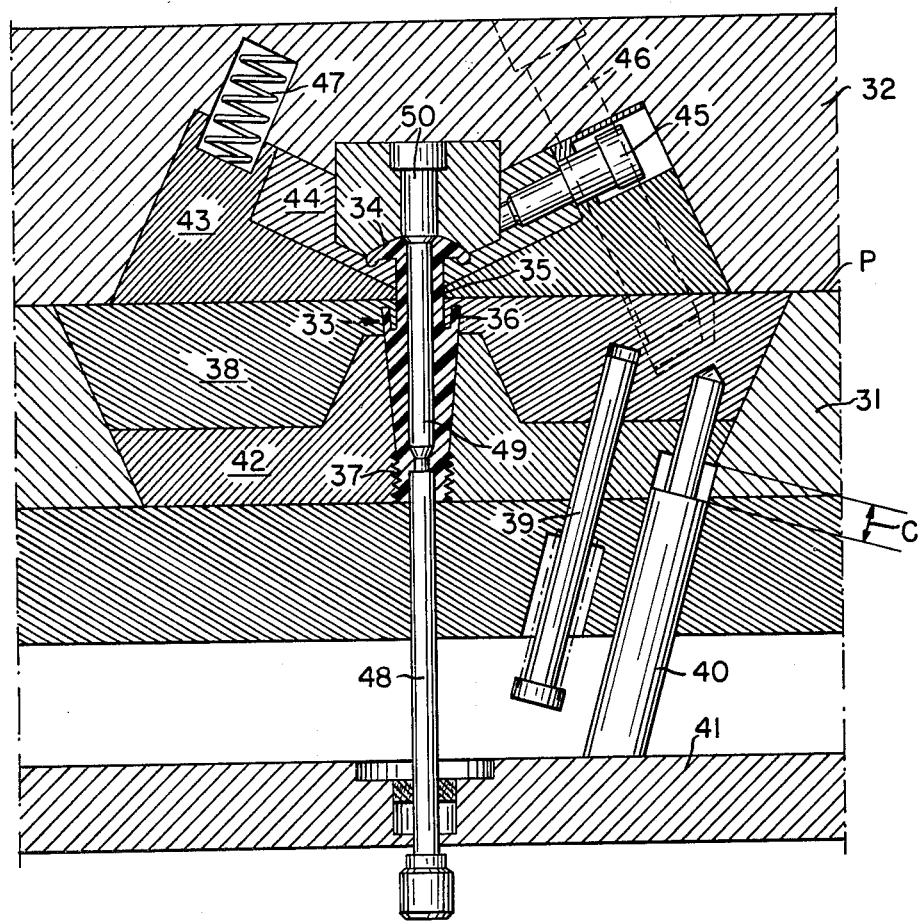
FIG. 2 is an axial section through another mold, also in closed position, having only sliding parts.

FIG. 2 shows a variant of the articulated mold which is the object of the invention in which the movable parts are only sliding parts. Two dies 31 and 32 separated by a parting surface or joint plane P are provided with movable shells and with mechanical parts which will now be described in detail.

The molded object 33 comprises a collar 34, the bottom of which is hollow, which increases the "opposed undercut" effect with the space contained between the cylindrical portion 35 and the fastening lugs 36. A threaded cylindrical portion 37 terminates the molded object 33.

In the die 31, there are six segments of shell 38 capable of sliding on oblique guide fingers 39 when they are driven by pushers 40, in their turn driven by the drive plate 41.

A core 42 having six segments permits the molding of the outer shapes of the object 33. These six segments are guided and driven in the same manner as the segments of the shell 38 by the fingers 39 and, after moving over the partial path C, by the pushers 40.

At its upper part, the die 32 contains a shell 43 having four segments, each having a sliding part 44 provided with a guide finger 45. Inclined fingers 46 fastened in the die 32 pass through the segments of the shell 43; springs 47 are arranged in the die 32 and the segments of the shell 43.

Finally, a spindle consisting of two parts 48 and 49 permits the molding of the inner shapes of the molded object 33. The upper part 49 has a head 50 which permits the molding of the upper portion of the molded object 33 as well as the extraction of the molded object 33.

The operation of the mold opening mechanism will now be described, starting from the closed position shown in FIG. 2.

First of all, the die 32 is lifted; it follows that the segments of the shell 43, applied against the parting surface or joint plane P under the push of the springs 47, slide on the inclined fingers 46 and move away radially; their sliding parts 44, driven by the guide fingers 45, descend parallel to the axis, thus freeing the collar 34 of the molded object 33; thereupon, when the guide fingers 45 arrive at the end of their stroke, the sliding parts 44 are in their turn moved apart radially. Finally, under the effect of a vertical displacement of the drive plate 41 in upward direction, the following movements take place: the pushers 40 lift the segments of the shell 38 moving them apart radially in such a manner that their movement follows the inclination of the fastening lugs 36 of the molded object 33; after moving over the path C, the six segments of the core 42 in their turn are raised and moved apart by the pushers 40, while the lower part 48 of the spindle ejects the molded object 33 in upward direction.

Of course, different variant embodiments are possible without going beyond the scope of the invention and the two examples which have been described are in no way limitative.

What is claimed is:

1. Articulated mold for the manufacture of molded objects having opposed undercut parts, comprising two dies whose parting surface passes between the opposed undercut parts of the molded object, these two dies being movable perpendicularly with respect to each other, and several groups of shells composed of segments arranged within said dies and capable of moving about guide members under the action of pushers, characterized by a single drive piece outside said dies and movable in the same direction as the dies, driving said pushers along, the pushers being so arranged with the guide members that the movements of said shells succeed each other when the single drive piece actuates the opening of the mold by the steps of freeing the space located between the opposed undercut parts, and then freeing each of said undercut parts, and finally ejecting the molded object, whereas the reverse movements occur upon closing of the mold.

2. Articulated mold according to claim 1, characterized by the fact that the parting surface of the two dies is flat.

3. Articulated mold according to claim 1 or 2, characterized by the fact that the drive piece is a plate parallel to the parting surface of the two dies.

4. Articulated mold according to claim 1, characterized by the fact that the guide members are fingers integral with the shells or the dies, respectively, and sliding in boreholes drilled in the dies or the shells, respectively.

5. Articulated mold according to claim 1, characterized by the fact that the guide members are pins integral with the dies around which pins the shells pivot.

6. Articulated mold according to claim 1, characterized by the fact that the shells of at least one die are pushed towards the parting surface by elastic means.

7. Articulated mold according to claim 6, characterized by the fact that the elastic means are springs which are compressed by the closing of the mold.

* * * * *

UNITED STATES PATENT AND TRADEMARK OFFICE
CERTIFICATE OF CORRECTION

PATENT NO. : 4,209,160

DATED : June 24, 1980

INVENTOR(S) : Gérard Vanotti

It is certified that error appears in the above-identified patent and that said Letters Patent are hereby corrected as shown below:

First page, Item [73], after "France", insert -- , and VAPE S.A., Oyonnax, France . a part interest each --.

Signed and Sealed this

Fourteenth Day of October 1980

[SEAL]

Attest:

SIDNEY A. DIAMOND

Attesting Officer

Commissioner of Patents and Trademarks